Figure 2:
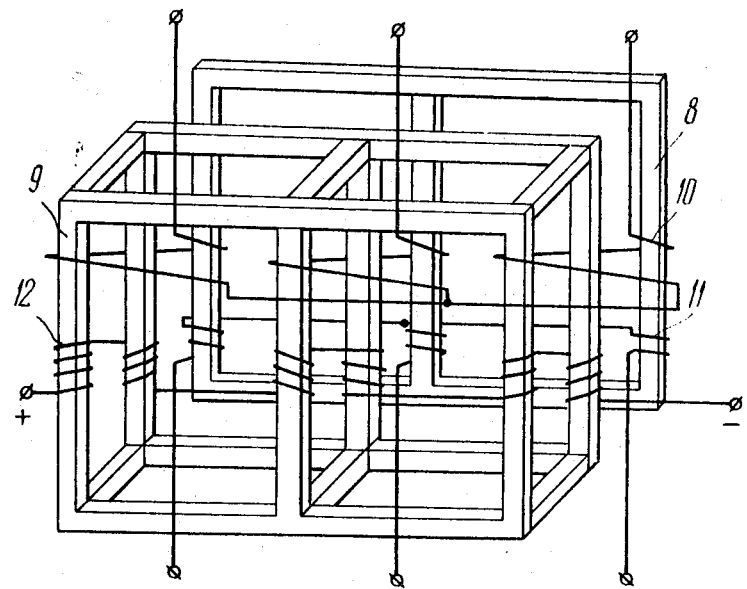

United States Patent
Kroger et al.

[15] 3,683,260
[45] Aug. 8, 1972

[54] THREE-PHASE STATIC CONVERTER WITH A STABILIZED OUTPUT VOLTAGE

[72] Inventors: Alfon Fedorovich Kroger; Yan Petrovich Stabulniek, both of Riga, U.S.S.R.

[73] Assignee: Fiziko-Energetichesky Institut An Latviiskoi SSR, Riga, U.S.S.R.

[22] Filed: July 5, 1968

[21] Appl. No.: 742,908

[30] Foreign Application Priority Data
July 17, 1967    U.S.S.R. .................. 1171623

[52] U.S. Cl. ........................... 321/3, 321/4, 321/5, 321/25, 323/89, 336/51, 336/160, 336/215
[51] Int. Cl. ........................ H02m 5/44, G05f , H01f
[58] Field of Search .............. 321/4, 5, 3, 10, 16, 25; 336/5, 160, 215; 323/89; 333/79

[56]    References Cited

UNITED STATES PATENTS

| | | | |
|---|---|---|---|
| 3,117,292 | 1/1964 | Bixby | 333/79 |
| 3,300,740 | 1/1967 | Herzog | 333/79 |
| 3,401,326 | 9/1968 | Hunter | 321/5 |
| 1,275,968 | 8/1918 | Meyer | 321/3 X |
| 1,897,249 | 2/1933 | Fleming | 321/10 X |
| 2,844,804 | 7/1958 | Roe | 336/160 |
| 3,262,036 | 7/1966 | Clarke et al | 321/5 UX |

FOREIGN PATENTS OR APPLICATIONS

| | | | |
|---|---|---|---|
| 134,779 | 1961 | U.S.S.R. | 333/79 |

*Primary Examiner*—William H. Beta, Jr.
*Attorney*—Waters, Roditi, Schwartz & Nissen

[57]    ABSTRACT

A three-phase static converter with a stabilized output voltage. The static converter includes a rectifier having an input and an output, transformer filter having a primary connected in parallel with the output of the rectifier and a capacitor connected in series with the primary, a self-contained three-phase inverter with a regulated output voltage, a variable-reluctance regulating transformer connected to the self-contained inverter at the output thereof to regulate its output voltage, the self-contained inverter electrically coupled to the rectifier through the secondary of the transformer filter, the secondary having one end connected to the output of the rectifier and the other end connected to the input of the self-contained inverter so as to be connected in series therebetween.

1 Claim, 2 Drawing Figures

PATENTED AUG 8 1972 3,683,260

THREE-PHASE STATIC CONVERTER WITH A STABILIZED OUTPUT VOLTAGE

The present invention relates to static converters of direct current and single-phase alternating current into three phase alternating current.

There exist static converters changing single-phase alternating current into three-phase alternating current, comprising a rectifier, a filter, and a self-contained inverter. In them the coupling between the rectifier and the self-contained inverter is by means of LC-filters.

A disadvantage of such converters is that the LC-filters are heavy in weight and large in size.

A further disadvantage is that these filters do not provide for the reliability of the self-contained inverter under transient conditions. They do not protect the converter components from supply-line overvoltages and may, under certain conditions, give rise to undesired oscillations, voltage and current resonances. Such resonances result in overvoltages in the converter circuits, impair the technical and economical performance of the plant, and may result in the breakdown of some components.

A still further disadvantage of existing types of static converters is that the output voltage is regulated in the input rectifier which is unsatisfactory when the static converter is to be powered from two sources (an a.c. source and a d.c. source), since this entails an increase in the size and weight of the filters and impairs the reliability of the static converter.

An object of the present invention is to eliminate the above-mentioned disadvantages.

A specific object of the invention is to provide a static converter for the transformation of direct current and single-phase alternating current into three-phase alternating current with a regulated output voltage.

The object is accomplished by a static converter of direct current and single-phase alternating current into three-phase alternating current, in which electric coupling between a self-contained inverter and a rectifier is provided by a transformer filter whose primary is connected in parallel with the rectifier output, and whose secondary is connected between the rectifier output and the input of the self-contained inverter with a regulated output voltage.

The output voltage of the self-contained inverter is preferably regulated by a variable-reluctance regulating transformer.

With a much smaller weight and size, lower power rating of the components, and greater reliability as compared with existing types, the static converter disclosed herein transforms direct current and single-phase alternating current into three-phase alternating current with a regulated output voltage. This type of static converter may be widely used on electric-traction railroads, notably for the conversion of the direct current and single-phase alternating current supplied by the contact line at 3,000 volts with voltage variations up to 30 per cent into a regulated three-phase voltage of 220/380 volts, 50c/s to power the air-conditioners, ventilation, fluorescent lighting fixture and other equipment of carriages.

Figure 1:
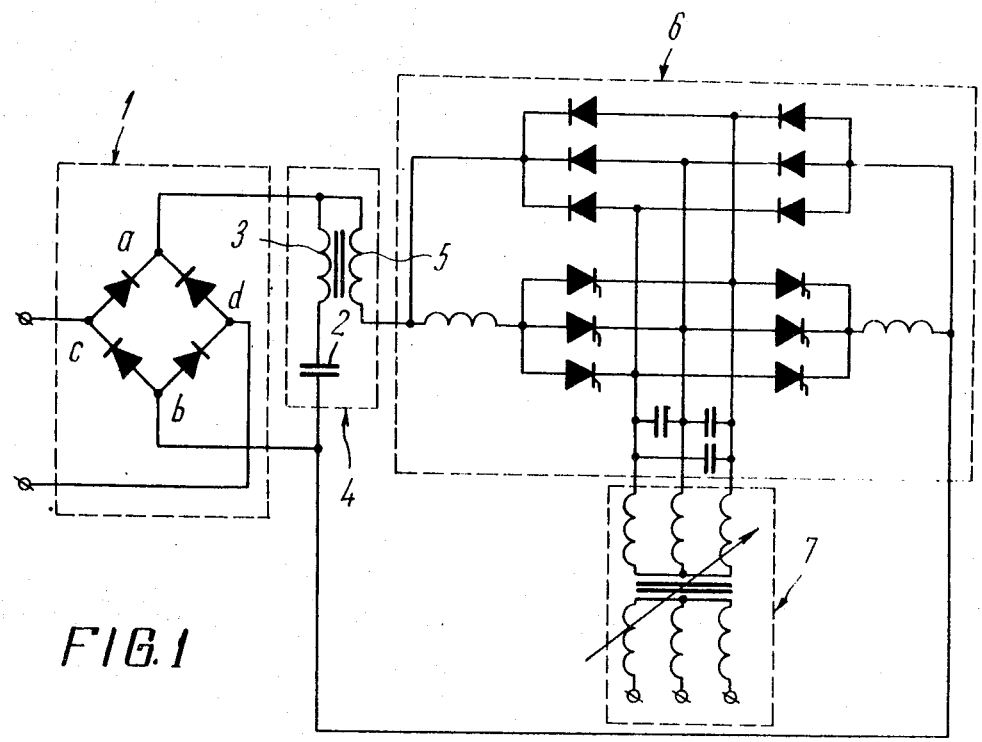

The invention will be best understood from the following description of a preferred embodiment when read in connection with the accompanying drawings in which:

FIG. 1 is a circuit diagram of a static converter according to the invention, and FIG. 2 is a perspective view of a variable-reluctance regulating transformer, according to the invention.

Referring to FIG. 1, there is shown a static converter which comprises a single-phase bridge rectifier 1 which can be powered from a single-phase a.c. or a d.c. source, and a transformer filter 4 whose primary 3 is connected in parallel with the output terminals $a$ and $b$ of the rectifier 1 through a capacitor 2, and whose secondary 5 is connected to the terminal $a$ of the rectifier 1 at one end, and to the input of a self-contained inverter 6, at the other end. The output of the self-contained inverter 6 is coupled to a regulating transformer (FIG. 2) comprising a main core 8 and a magnetic shunt 9, both enveloped by the primary 10. The secondary 11 of the transformer 7 is wound on the main core 8, and the control winding 12 is wound on the magnetic shunt 9.

The operation of the static converter disclosed herein, will next be considered as powered from a single-phase a.c. line. The input rectifier 1 then operates as an ordinary full-wave rectifier which feeds the transformer filter 4 a rectified current with a considerable ripple. Since the primary 3 with the capacitor 2 placed in it, and the secondary 5 have an equal number of turns and meet at a common junction, the varying components induced in them are in opposite-phase and cancel one another so that a smoothened direct current appears at the output of the transformer filter 4. The filter 4 also suppresses any overvoltages and voltage surges due to the supply line. Furthermore, the secondary 5 of the transformer filter 4, placed between the output of the rectifier 1 and the input of the self-contained inverter 6, supplies an additional inductance which improves the commutation of the inverter at starting and also under a suddenly varying load (such as when ad induction motor is being started). From the output of the transformer filter 4 the direct current is applied to the input of the self-contained inverter 6 which transforms it into a three-phase alternating current. The regulating transformer 7 connected to the output terminals of the self-contained inverter 6 both transforms the voltage to the requisite magnitude and regulates it against variations in the input voltage and the load. The output voltage is regulated as follows. Since the primary 10 of the regulating transformer 7 (FIG. 2) envelopes both the main core 8 and the magnetic shunt 9, the current traversing the primary establishes a magnetic flux both in the main core 8 and the magnetic shunt 9. As the magnetization of the shunt 9 due to the control winding 12 varies, the distribution of the magnetic flux between the main core 8 and the magnetic shunt 9 also varies, and so does the output voltage of the regulating transformer 7. The current through the control winding 12 is made to change so that the output voltage is maintained at the desired level.

When the static converter operates from a d.c. supply, the supply current flows only in the arms $ac$ and $bd$ of the rectifier 1. Beyond the rectifier, the transformer filter 4 suppresses any overvoltages, fluctuations and surges in the d.c. supply voltage, and the direct current from the transformer filter 4 is applied to the input of the self-contained inverter 6. In other respects the static converter operates exactly as when powered from an a.c. supply line.

What is claimed is:

1. A static converter of direct current and single-phase alternating current into three-phase alternating current, said converter comprising: a rectifier having an input and an output, a transformer filter having a primary connected in parallel with the output of said rectifier and a capacitor connected in series with said primary, a self-contained three-phase inverter with a regulated output voltage, a variable-reluctance regulating transformer connected to the self-contained inverter at the output thereof to regulate its output voltage, said self-contained inverter being electrically coupled to said rectifier through the secondary of said transformer filter, said secondary having one end connected to the output of said rectifier and another end to the input of said self-contained inverter so as to be connected in series therebetween, said regulating transformer comprising a main core, a magnetic shunt, a primary winding on said main core and shunt, a secondary winding on said main core, and a control winding on said shunt.

* * * * *